(No Model.)
C. C. SCHWANER.
NECK YOKE ATTACHMENT.
No. 530,355. Patented Dec. 4, 1894.
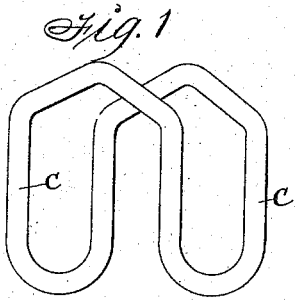
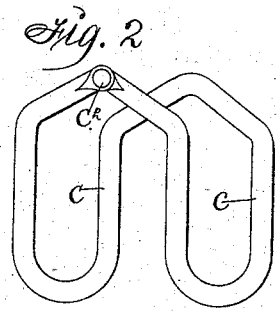
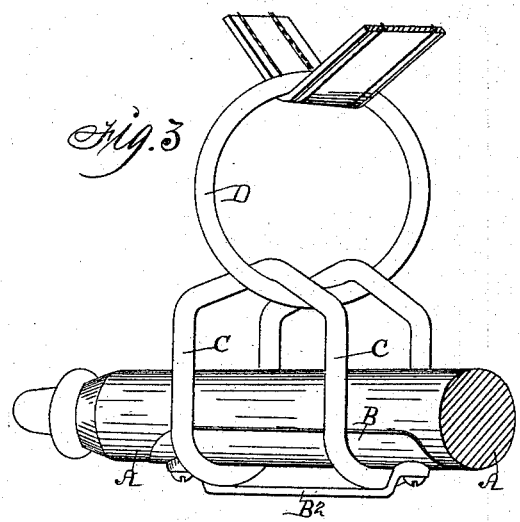
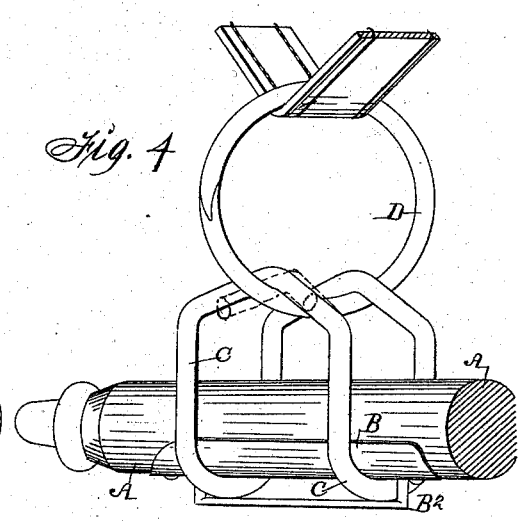
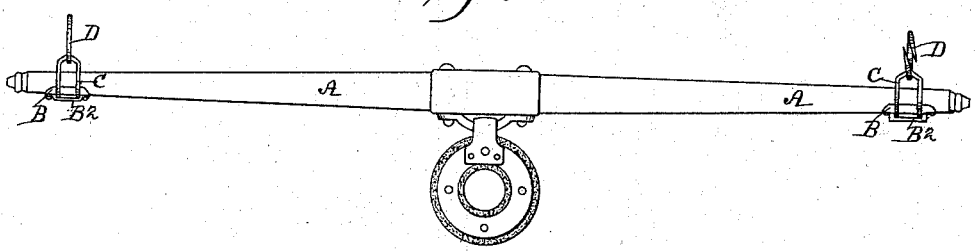
Witnesses:
W. J. Sankey
J. Ralph Orwig
Inventor: Christian C. Schwaner
By Thomas G. Orwig, Attorney
THE NORRIS PETERS CO., PHOTO-LITHO., WASHINGTON, D. C.

UNITED STATES PATENT OFFICE.

CHRISTIAN C. SCHWANER, OF WINTERSET, IOWA.

NECK-YOKE ATTACHMENT.

SPECIFICATION forming part of Letters Patent No. 530,355, dated December 4, 1894.

Application filed April 22, 1892. Serial No. 430,192. (No model.)

*To all whom it may concern:*

Be it known that I, CHRISTIAN C. SCHWANER, a citizen of the United States of America, residing at Winterset, in the county of Madison and State of Iowa, have invented a new and useful Neck-Yoke Attachment, of which the following is a specification.

My object is to connect rings with the ends of a pole yoke by means of coupling devices that will engage the yoke at separate points and vibrate at right angles to the longitudinal axis of the yoke and in no other direction as required to prevent rattling and friction, and to support a ring in two distinct bearings and allow it to vibrate in a plane parallel with the yoke in such a manner that the ring in the coupling will readily adjust itself relative to the side motions of a horse relative to a pole and the combined ring and coupling readily move jointly in a plane at right angles to the yoke as required to adjust themselves to the forward motions of the horse relative to the yoke and pole.

My invention consists in the construction and formation of the coupling device and is adapted for the purposes specified, and in certain other minor details as hereinafter set forth, pointed out in my claims and illustrated in the accompanying drawings, in which—

Figure 1 is a perspective view of a coupling device cast complete in one piece and adapted for connecting a ring with a pole yoke. Fig. 2 is a modification of Fig. 1 showing the coupling device made from a single piece of metal rod by bending it into proper shape and connecting its ends by means of a screw. Fig. 3 shows, in perspective, a solid ring coupled to the end portion of a pole yoke by means of my coupling device, a detachable metal loop and a metal plate placed under the loop. Fig. 4 shows, in perspective, an open ring detachably connected with the yoke by means of a combined metal plate and loop fixed to the yoke. Fig. 5 shows a complete yoke and an open ring connected with one end and a solid ring with the other end.

Referring to the accompanying drawings the reference letter A designates the neck yoke.

B are metal plates secured to the neck yoke near its ends and having the loops $B^2$ formed integral or detachably connected therewith.

C is a coupling device adapted for connecting a metal ring with the neck yoke. It is composed of an elongated metal loop bent approximately semi-circular in its central portion with its ends straight and parallel with each other. This coupling may be constructed in many different ways without departing from the spirit of my invention. In Fig. 2 it is made by bending a metal rod in the desired shape and then having its ends secured by means of a screw $C^2$; or the ends may overlap each other as indicated by dotted lines in Fig. 4.

D is a metal ring adapted to be connected with the coupling C to provide means for attaching a breast strap with the coupling device. In Fig. 4 this ring is shown open for purposes hereinafter set forth.

My preferred method of attaching the ring and coupling device is as follows: I first secure the plate B to the neck yoke and then detachably connect the loop $B^2$ therewith. I then connect the coupling device and ring and pass the coupling device over the end of the neck yoke and in the loop $B^2$ and secure the said loop. Another practical method of connecting these parts consists in first placing the coupling device in the loop, which may be formed integral with the plate if desired and then employing an open ring to be connected with the coupling device.

It will be necessary in order to prevent lateral movements and rattling of the coupling device in the metal loop to have the said coupling device closely engage the ends of loop and as the loops in different neck yokes vary in length, I prefer to construct the coupling devices of malleable metal so that it may be spread to fit loops of various lengths.

Having thus described the construction and function of each of the parts, what I claim as my invention, and desire to secure by Letters Patent, is—

1. A coupling device adapted for connecting a metal ring with a neck yoke, consisting of an elongated metal loop bent at its center and its end portions in parallel position, a metal ring connected with the end portions of the coupling to swing at right angles thereto, a neck yoke extended through the parallel parts of the coupling and a metal loop fixed to the neck yoke to secure the coupling device to the neck yoke so as to prevent it from sliding longitudinally relative to the yoke and to produce a hinged connection with the yoke, all arranged and combined as and for the purposes stated.

2. A neck yoke attachment comprising an elongated metal loop bent in its approximate central portion to partially encircle the end portion of a neck yoke substantially as set forth, a metal rod secured to the neck yoke and passing over the curved portion of the aforesaid loop and in contact with its outer edges, in the manner set forth, for the purposes stated, and a ring extended through the end portions of the aforesaid loop, all arranged and combined substantially as shown and described.

CHRISTIAN C. SCHWANER.

Witnesses:
BENONI H. LEECH,
ROBERT H. COOPER.